S. C. DAVIS.
Grazing Animals.
No. 34,882. Patented April 8, 1862.
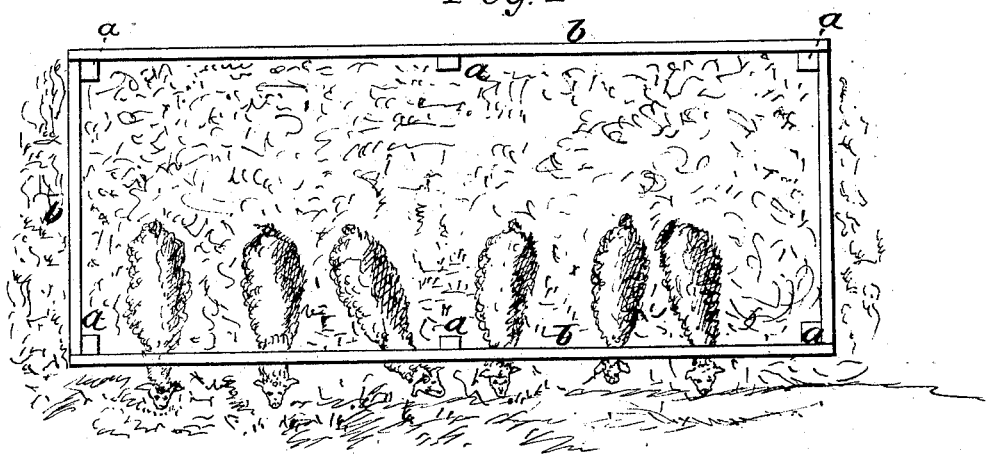
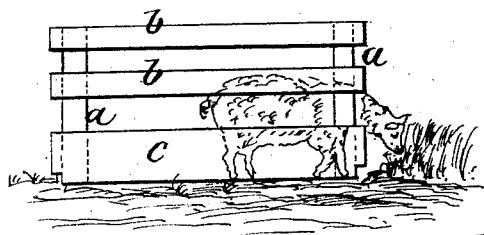
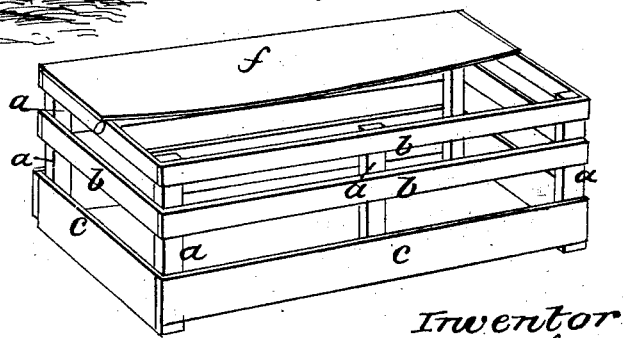

United States Patent Office.

SIMEON C. DAVIS, OF MEDINA, NEW YORK.

IMPROVED METHOD OF GRAZING SHEEP AND OTHER ANIMALS.

Specification forming part of Letters Patent No. 34,882, dated April 8, 1862.

*To all whom it may concern:*

Be it known that I, SIMEON C. DAVIS, of Medina, in the county of Orleans and State of New York, have invented a new and Improved Method of Grazing or Soiling Sheep, &c.; and I do hereby declare that the following is a full and exact description thereof, reference being had to the accompanying drawings, making part of this specification, in which—

Figure 1 is a plan view representing sheep feeding by my improved method. Fig. 2 is an end view in elevation of one of my portable grazing frames or racks in use. Fig. 3 is a perspective view of the rack alone.

Like letters designate corresponding parts in all of the figures.

The object of my invention is an improvement by which sheep and other small animals may be fed during the grazing season at greater economy of food and less labor than by the usual method of stall-feeding, hurdling, or grazing at large.

My improvement consists in providing a portable frame or rack of suitable construction to confine a limited number of the flock—say six or eight—which is stationed by the side of a field of clover or other pasturage and so constructed that the sheep feed on the outside of the frame and not within it, its use being chiefly to restrain them from trampling upon and injuring the grass. A convenient form is the quadrangular—say sixteen feet in length by six in width and of a height sufficient to prevent them from escaping. An upright $a\,a$ at each corner and one midway on the sides serve to nail the strips $b\,b$ to, the lower board of which $c$ should be ten inches, or thereabout, in width. Above this on the side a space should be left sufficiently large for the sheep to pass their heads through easily in order to reach the grass outside of the frame. The bottom boards at the sides should be one and one-half inch above the ground, and those at the end should reach and rest on the ground in order that the first may offer less resistance in moving it sidewise and that the latter may facilitate the moving by enabling the frame to slide on the ground when force is used in the proper direction. Above the space which is left for the purpose named the frame may be raised to the proper height with narrow strips, which will not increase its weight materially. A sufficient number of these frames to contain the flock are ranged beside a field where the pasturage has acquired a suitable growth—say a height of eight inches or a foot—and the sheep placed therein. They will feed through the side of the frame, as represented in Fig. 1, until they have consumed all within their reach, which will generally be about one foot and a half. The number should be so apportioned to each frame that they will consume the amount that is accessible in about twelve hours, so that the inclosures will require to be advanced to the fresh portions of grass each night and morning.

The number of sheep in each frame may be varied as the abundance or scarcity of the herbage may require, or they may be moved oftener, if necessary. By this means they eat everything clean and completely and do not waste the least by treading it beneath their feet, as in ordinary grazing or hurdling, where an immense amount is wasted from this cause. The frames being moved forward regularly till the field has been entirely grazed over once, it will by that time have grown anew at the beginning, and the process is repeated twice or oftener in a season. The grass grows better from being left undisturbed for a period of time than when the flock is allowed to roam over it and constantly keep it in check by slight grazing and much trampling, and thereby a much greater crop is produced in a season. This, in addition to its being more perfectly consumed, gives very great advantage in point of economy over the common system of grazing or hurdling, as the same amount of land will feed double or treble the number. By this gradual and regular progression of the portable inclosures over the field the manure is uniformly distributed, thus easily restoring to the soil the elements for producing the succeeding crop. By feeding from larger and thicker grass the dew does not evaporate so fast but that the animals receive a sufficient supply of moisture from it and do not ordinarily require watering. The increase of fat is promoted by their inactivity and their wool does not suffer injury by roaming, while the frames admit of their being protected from the sun in the easiest manner possible by attaching a screen made of boards or cheap cloth f, Fig. 3, to the top or side most exposed to the direct rays thereof.

I aware that pens for confining and feeding sheep have been made portable in order that by shifting their position from time to time the manure may become evenly distributed; but in these the hay or other food is fed within the inclosure, as in other sheep-yards, and is subject to being trampled on by the flock. I am also aware that it is common to graze sheep by means of hurdles, but in this also they are allowed to tread upon the herbage which they feed upon. My invention differs from these in having for its express object the protection of the grass from being injured by being trodden upon before it is eaten, while it also effects the equal distribution of the manure, obviates the cost of fences, and permits the undisturbed growth of the pasturage, after having been once grazed, until it has attained a suitable size for repeating the process. The flock is also always accessible for inspection or attention when it may be required, and may more easily be fattened and selected for the shambles.

Various forms of construction may be adopted besides the one described, that being the simplest manner by which these results may be attained—viz., confining the flock in portable inclosures which allow them to feed outside or beyond the barriers which restrain them, while preventing the injurious effect of their feet and manure on the unfed pasture.

The same system is applicable to calves and other small grazing animals by constructing the portable frames of a suitable size for the purpose.

I therefore do not claim the use of a movable pen or rack simply; but

What I claim as my invention, and desire to secure by Letters Patent, in the above-described method of grazing sheep and other animals, is—

The employment of movable racks or frames provided with apertures or spaces in their sides in such a manner as to allow the animals to reach without escaping through them, and thereby always to feed upon untrodden grass outside of the racks, substantially as and for the purposes herein specified.

In witness whereof I have hereunto signed my name in the presence of two subscribing witnesses.

SIMEON C. DAVIS.

Witnesses:
  H. S. BUALS,
  S. H. CLARK.